(12) United States Patent
Shibata

(10) Patent No.: US 9,052,862 B2
(45) Date of Patent: *Jun. 9, 2015

(54) CAUSING A WIRELESS CONNECTION TO BE ESTABLISHED BETWEEN A WIRELESS COMMUNICATION DEVICE AND AN EXTERNAL DEVICE

(71) Applicant: BROTHER KOGYO KABUSHIKI KAISHA, Nagoya-shi, Aichi-ken (JP)

(72) Inventor: Hiroshi Shibata, Obu (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/328,017

(22) Filed: Jul. 10, 2014

(65) Prior Publication Data

US 2014/0320925 A1      Oct. 30, 2014

Related U.S. Application Data

(63) Continuation of application No. 13/431,851, filed on Mar. 27, 2012, now Pat. No. 8,817,304.

(30) Foreign Application Priority Data

Jun. 14, 2011 (JP) ................................. 2011-132284

(51) Int. Cl.
*G06F 3/12* (2006.01)
*H04W 8/00* (2009.01)
*H04W 84/20* (2009.01)

(52) U.S. Cl.
CPC ............. *G06F 3/1292* (2013.01); *H04W 8/005* (2013.01); *H04W 84/20* (2013.01); *G06F 3/1203* (2013.01); *G06F 3/1236* (2013.01)

(58) Field of Classification Search
CPC ..... G06F 3/1292; G06F 3/1236; H04W 8/005
USPC ......................................................... 358/1.15
See application file for complete search history.

(56) References Cited

U.S. PATENT DOCUMENTS

2006/0221915 A1   10/2006 Gatta et al.
2010/0260069 A1   10/2010 Sakamoto et al.
(Continued)

FOREIGN PATENT DOCUMENTS

CN        101246459 A        8/2008
CN        101771586 A        7/2010
(Continued)

OTHER PUBLICATIONS

\United States Patent and Trademark Office, Non Final Office Action for U.S. Appl. No. 13/431,876 {related to above-captioned patent application), mailed Jan. 7, 2014.
(Continued)

*Primary Examiner* — Eric A Rust
(74) *Attorney, Agent, or Firm* — Merchant & Gould PC

(57) ABSTRACT

The wireless communication device may determine in which of a parent state and a child state the wireless communication device is to operate in a case where the wireless communication device receives a first type of signal, and determine the wireless communication device is to operate in the parent state in a case where the wireless communication device receives a second type of signal. The wireless communication device may send a first wireless profile to a first external device so as to establish a wireless connection with the first external device in a case where the wireless communication device is to operate in the parent state, and receive a second wireless profile from a second external device so as to establish a wireless connection with the second external device in a case where the wireless communication device is to operate in the child state.

17 Claims, 5 Drawing Sheets

(56) References Cited

U.S. PATENT DOCUMENTS

| | | |
|---|---|---|
| 2010/0303001 A1 | 12/2010 | Tamura et al. |
| 2011/0026504 A1 | 2/2011 | Feinberg |
| 2011/0075589 A1 | 3/2011 | Bradley et al. |
| 2011/0122835 A1 | 5/2011 | Naito et al. |
| 2011/0244897 A1 | 10/2011 | Shibuya |
| 2011/0271334 A1 | 11/2011 | Yang et al. |
| 2012/0051244 A1 | 3/2012 | Nagara |
| 2012/0147268 A1 | 6/2012 | Hassan et al. |
| 2012/0320401 A1 | 12/2012 | Shibata |
| 2012/0320413 A1 | 12/2012 | Nagasaki |
| 2013/0148162 A1 | 6/2013 | Park et al. |

FOREIGN PATENT DOCUMENTS

| | | |
|---|---|---|
| CN | 102076107 A | 5/2011 |
| EP | 1959341 A | 8/2008 |
| JP | 2002-152216 A | 5/2002 |
| JP | 2004-357057 A | 12/2004 |
| JP | 2006-165623 A | 6/2006 |
| JP | 2009-089230 A | 4/2009 |
| JP | 2009-301138 A | 12/2009 |
| JP | 2010-187168 A | 8/2010 |
| JP | 2010-278851 A | 12/2010 |
| JP | 2011-217273 A | 10/2011 |
| WO | 2007/061140 A1 | 5/2007 |
| WO | 2011/039719 A1 | 4/2011 |
| WO | 2011/041735 A1 | 4/2011 |

OTHER PUBLICATIONS

Wi-Fi Alliance, "Wi-Fi Certified Wi-Fi Protected Setup: Easing the User Experience for Home and Small Office Wi-Fi Networks," Dec. 1, 2010, pp. 1-12.
Wi-Fi Alliance, "Wi-Fi Certified Wi-Fi Direct Personal, Portable Wi-Fi Technology," Oct. 1, 2010, pp. 1-14.
European Patent Office, extended European Search Report for European Patent Application No. 12161560.3 (counterpart European patent application), dated Oct. 31, 2012.
Wi-Fl Alliance, Wi-Fi Alliance Technical Committee P2P Task Group, "Wi-Fi Peer-to-Peer (P2P) Technical Specification, Version 1.1" (2010), pp. 1-159. (cited in specification at Para. [0012]).
Office Action from Chinese Patent Application No. 201210085533.5 mailed Aug. 5, 2014.
Final Office Action from U.S. Appl. No. 13/431,876 mailed Jul. 23, 2014.
Office Action issued in related Japanese Patent Application No. 2011-132284, mailed Jan. 6, 2015.
Office Action issued in related Japanese Patent Application No. 2011-132283, mailed Feb. 10, 2015.
Chinese Office Action issued in CN application No. 201210085533.5, Mar. 24, 2015.

CAUSING A WIRELESS CONNECTION TO BE ESTABLISHED BETWEEN A WIRELESS COMMUNICATION DEVICE AND AN EXTERNAL DEVICE

CROSS-REFERENCE TO RELATED APPLICATIONS

This application is a continuation of U.S. patent application Ser. No. 13/431,851, filed Mar. 27, 2012, and further claims priority to Japanese Patent Application No. 2011-132284, filed on Jun. 14, 2011, the contents of both of which are hereby incorporated by reference into the present application.

TECHNICAL FIELD

A technique disclosed in the present specification relates to a wireless communication device.

DESCRIPTION OF THE RELATED ART

Conventionally, Wi-Fi Direct (called "WFD" below) formulated by Wi-Fi alliance, is known. A WFD wireless network consists of one apparatus that operates as a Group Owner (called "G/O apparatus" below), and one or more apparatuses that operate as a client (called "client apparatus" below) which is administrated by the G/O apparatus. Conventionally, in case a wireless connection is to be established between a pair of apparatuses according to WFD, it is known how to determine which of the pair of apparatuses is to operate as the G/O and which is to operate as the client.

SUMMARY

In the present specification, a technique is presented for causing a wireless connection to be established appropriately between a wireless communication device and an external device.

One technique disclosed in the present application is a wireless communication device configured to be capable of operating selectively in any state among a plurality of states including a parent state performing as a parent station of a wireless network and a child state performing as a child station of the wireless network. The wireless communication device may comprise one or more processors, and a memory that stores a computer program including instructions executed by the one or more processors. The instructions may cause the one or more processors, when executed by the one or more processors, to function as a communication controlling unit, a state determination unit, and an establishing controlling unit. The communication controlling unit may be configured to receive a signal from an external. The state determination unit may be configured to determine in which of the parent state and the child state the wireless communication device is to operate in a case where the communication controlling unit receives a first type of signal including specific information. The state determination unit may be configured to determine the wireless communication device is to operate in the parent state in a case where the communication controlling unit receives a second type of signal not including the specific information. The establishing controlling unit may be configured to send a first wireless profile to a first external device so as to establish a wireless connection with the first external device by using the first wireless profile in a case where it is determined that the wireless communication device is to operate in the parent state. The establishing controlling unit may be configured to receive a second wireless profile from a second external device so as to establish a wireless connection with the second external device by using the second wireless profile in a case where it is determined that the wireless communication device is to operate in the child state.

Moreover, a method for realizing the wireless communication device is also novel and useful. In addition, a computer program for realizing the wireless communication device and a non-transitory computer readable storage medium that stores the computer program are also novel and useful.

EMBODIMENT

Configuration of System

Figure 1:
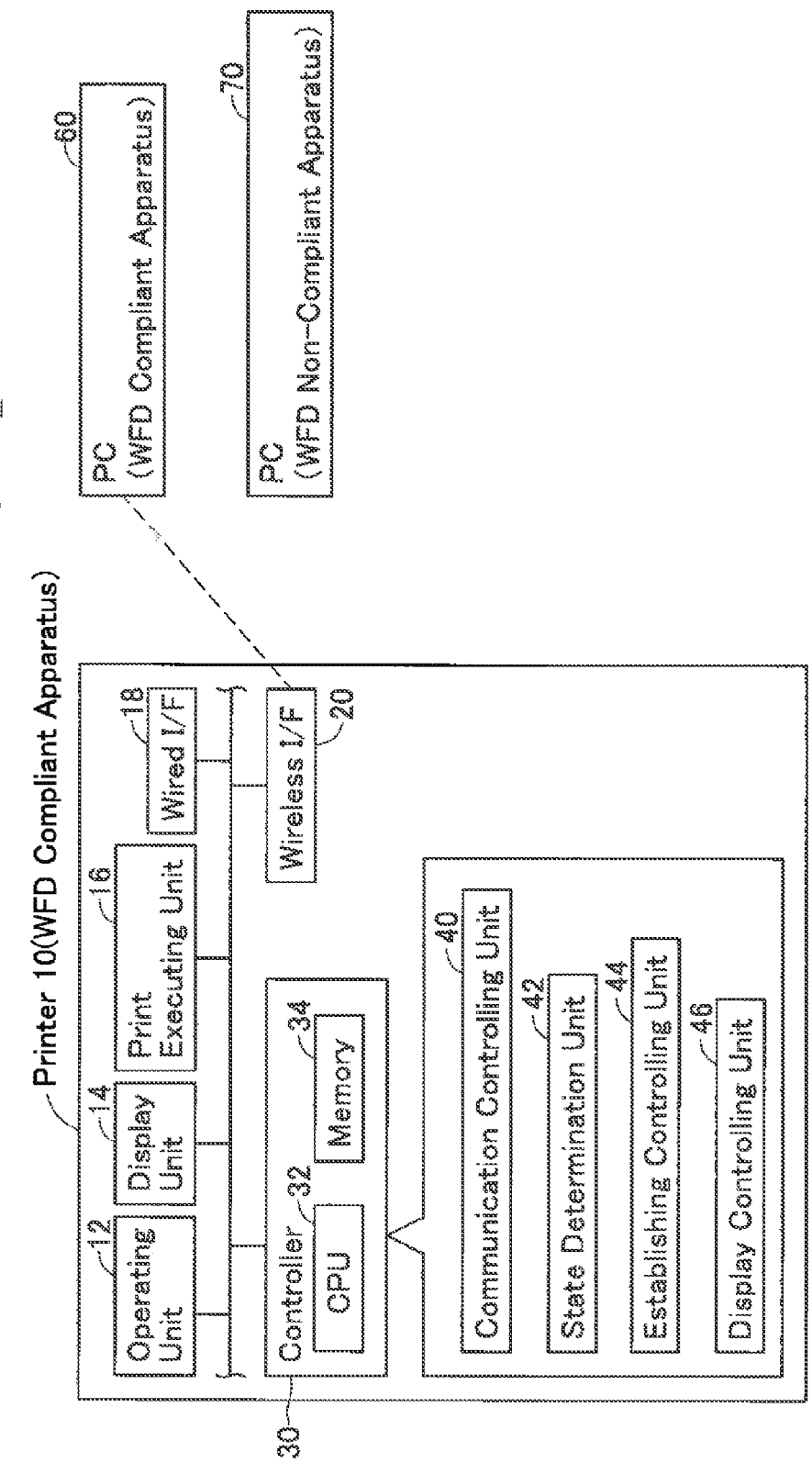
FIG. 1 shows an example of the configuration of a communication system.

As shown in FIG. 1, a communication system 2 comprises a printer 10 (a peripheral of PCs 60 and 70), and the plurality of PCs 60, 70. The printer 10 and the PC 60 are each capable of executing a wireless communication function in accordance with Wi-Fi Direct (to be described). Moreover, below, Wi-Fi Direct is called "WFD", and the wireless communication function in accordance with Wi-Fi Direct is called a "WFD function". The printer 10 and the PC 60 are capable of establishing a wireless connection in accordance with WFD, thereby constructing a wireless network. Consequently, the printer 10 and the PC 60 become capable of wirelessly communicating object data of a communication object, such as printing data, etc.

The PC 70 is not capable of executing the WFD function, but is capable of executing normal wireless communication. That is, the PC 70 is capable of establishing a known wireless connection with an AP (access point). As will be described in detail below, the printer 10 and the PC 70 can establish a wireless connection, thereby constructing a wireless network. Consequently, the printer 10 and the PC 70 become capable of wirelessly communicating object data of a communication object, such as printing data, etc.

(Configuration of Printer 10)

The printer 10 comprises an operating unit 12, a display unit 14, a print executing unit 16, a wired interface 18, a wireless interface 20, and a controller 30. The units 12 to 30 are connected with a bus line (reference number omitted). The operating unit 12 consists of a plurality of keys. A user can give various instructions to the printer 10 by operating the operating unit 12. The display unit 14 is a display for displaying various information. The print executing unit 16 comprises a printing mechanism such as an ink jet method, laser method, etc. printing mechanism, and executes printing according to an instruction from the controller 30. The wired interface 18 is an interface for performing wired communication, and is connected with a wired circuit (e.g., a LAN circuit). The wireless interface 20 is an interface for performing wireless communication.

The controller 30 comprises a CPU 32 and a memory 34. The CPU 32 executes various processes according to a program stored in the memory 34. The memory 34 consists of a ROM, RAM, hard disk, etc. The memory 34 stores the program to be executed by the CPU 32, and stores data acquired or created in the course of the CPU 32 performing processes. The CPU 32 realizes the functions of a communication controlling unit 40, a state determination unit 42, an establishing controlling unit 44, and a display controlling unit 46 by executing processes according to the program.

(Configuration of PC 60)

The PC 60 comprises a CPU, memory, display, etc. (not shown). The memory of the PC 60 stores a printer driver program for the printer 10. The CPU of the PC 60 can create printing data of a printing object by using the printer driver program. In a state where a wireless connection has been established between the printer 10 and the PC 60, the PC 60 can wirelessly send the printing data to the printer 10. Moreover, except for being unable to perform the WFD function, the PC 70 has the same configuration as the PC 60.

(WFD)

WFD is a standard formulated by Wi-Fi Alliance. WFD is described in "Wi-Fi Peer-to-Peer (P2P) Technical Specification Version1.1" created by Wi-Fi Alliance.

As described above, the printer 10 and the PC 60 are each capable of executing the WFD function. Moreover, below, an apparatus capable of executing the WFD function (e.g., the PC 60) is called a "WFD compliant apparatus", and an apparatus incapable of executing the WFD function (e.g., the PC 70) is called a "WFD non-compliant apparatus".

In WFD, three states have been defined as the states of the apparatus: Group Owner state (called "G/O state" below), client state, and device state. A WFD compliant apparatus is capable of selectively operating in one state among the three states.

One wireless network consists of an apparatus in the G/O state and an apparatus in the client state. There can be only one G/O state apparatus present in one wireless network, but one or more client state apparatuses can be present. The G/O state apparatus administrates the one or more client state apparatuses. Specifically, the G/O state apparatus creates an administration list in which identification information (i.e., MAC address) of each of the one or more client state apparatuses is written. When a client state apparatus newly participates in a wireless network, the G/O state apparatus adds the identification information of that apparatus to the administration list, and when the client state apparatus leaves the wireless network, the G/O state apparatus deletes the identification information of that apparatus from the administration list.

The G/O state apparatus is capable of wirelessly communicating object data of a communication object (e.g., data that includes information of the network layer of the OSI reference model (printing data, etc.)) with an apparatus registered in the administration list, i.e., with an apparatus in the client state. However, with an apparatus not registered in the administration list, the G/O state apparatus is capable of wirelessly communicating data for participating in the wireless network (e.g., data that does not include network layer information (physical layer data such as a Probe Request signal, Probe Response signal, etc.)) but is not capable of wirelessly communicating the object data. For example, the communication controlling unit 40 (see FIG. 1) of the printer 10 that is in the G/O state is capable of wirelessly receiving printing data from the PC 60 that is registered in the administration list (i.e., the PC 60 that is in the client state), but is not capable of wirelessly receiving printing data from a PC that is not registered in the administration list.

Further, the G/O state apparatus is capable of relaying the wireless communication of object data (printing data, etc.) between a plurality of client state apparatuses. For example, in case the PC 60 that is in the client state should wirelessly send printing data to another printer that is in the client state, the PC 60 first wirelessly sends the printing data to the printer 10 that is in the G/O state. In this case, the communication controlling unit 40 of the printer 10 wirelessly receives the printing data from the PC 60, and wirelessly sends the printing data to the other printer. That is, the G/O state apparatus is capable of executing the function of an AP (access point) of a wireless network.

Moreover, a WFD compliant apparatus that is not participating in the wireless network (i.e., an apparatus not registered in the administration list) is a device state apparatus. The device state apparatus is capable of wirelessly communicating data for participating in the wireless network (physical layer data such as a Probe Request signal, Probe Response signal, etc.), but is not capable of wirelessly communicating object data (printing data, etc.) via the wireless network.

Moreover, a state flag which has a value corresponding to the current state of the printer 10 (G/O state, client state, device state) is stored in the memory 34 of the printer 10. Consequently, the controller 30 can learn the current state of the printer 10 by verifying the value of the state flag.

(PBC Mode Process (Case where Printer 10=Device State))

Next, the contents of processes executed by the printer 10 of the present embodiment will be described with reference to FIG. 2. Moreover, a WPS (Wi-Fi Protected Setup) wireless connection mode is used as the mode for executing a WFD wireless connection. The WPS wireless connection mode includes a PBC (Push Button Configuration) mode and a PIN (Personal Identification Number) code mode. In the present embodiment, the PBC mode is described. However, the technique of the present embodiment can also be applied to the PIN code mode.

The user performs a mode selection operation on the operating unit 12 of the printer 10 that is in the device state to select the PBC mode from among the PBC mode and the PIN code mode. Thereby, the PBC mode process of FIG. 2 is started.

In S10, the communication controlling unit 40 (see FIG. 1) sequentially executes a Scan process, a Listen process, and a Search process. The Scan process is a process for searching a G/O state apparatus present in the surroundings of the printer 10. Specifically, in the Scan process, the communication controlling unit 40 sequentially uses thirteen channels 1ch to 13ch to sequentially send a Probe Request signal wirelessly. Moreover, this Probe Request signal includes P2P (Peer 2 Peer) information indicating that the printer 10 is capable of executing the WFD function.

For example, in case a WFD compliant apparatus that is in the G/O state (called "specific G/O apparatus" below) is present in the surroundings of the printer 10, it has been determined in advance that the specific G/O apparatus uses one channel from among 1ch to 13ch. Consequently, the specific G/O apparatus wirelessly receives a Probe Request signal from the printer 10. In this case, the specific G/O apparatus wirelessly sends a Probe Response signal to the printer 10. This Probe Response signal includes P2P information indicating that the specific G/O apparatus is capable of executing the WFD function, and information indicating that the specific G/O apparatus is in the G/O state. Consequently, the communication controlling unit 40 can find the specific G/O apparatus. Moreover, the Probe Response signal further includes information indicating a device name of the specific G/O apparatus and a category (e.g., printer, PC, etc.) of the specific G/O apparatus, and a MAC address of the specific G/O apparatus. Consequently, the communication controlling unit 40 can acquire information relating to the specific G/O apparatus.

Moreover, e.g., in case a WFD compliant apparatus that is in the device state (called "specific device apparatus" below) is present in the surroundings of the printer 10, it has been determined in advance that the specific device apparatus uses one channel from among 1ch, 6ch, 11ch. Consequently, the specific device apparatus also wirelessly receives a Probe Request signal from the printer 10. In this case, the specific device apparatus wirelessly sends a Probe Response signal to the printer 10. However, this Probe Response signal includes information indicating that the apparatus is in the device state, and does not include information indicating that the apparatus is in the G/O state. Further, even if an apparatus that is in the client state wirelessly receives a Probe Request signal from the printer 10, the apparatus that is in the client state does not wirelessly send a Probe Response signal to the printer 10. Consequently, in the Scan process, the communication controlling unit 40 can appropriately find the specific G/O apparatus.

The Listen process is a process for responding to the Probe Request signal. The specific device apparatus can wirelessly send a Probe Request signal in the Search process (to be described). This Probe Request signal includes P2P information indicating that the specific device apparatus is capable of executing the WFD function. Upon wirelessly receiving the Probe Request signal from the specific device apparatus, the communication controlling unit 40 wirelessly sends a Probe Response signal. This Probe Response signal includes P2P information indicating that the printer 10 is capable of executing the WFD function, information indicating that the printer 10 is in the device state, information indicating the device name of the printer 10 and the category of the printer 10, and the MAC address of the printer 10. The specific device apparatus can find the printer 10 by means of the communication controlling unit 40 sending the Probe Response signal.

Moreover, a WFD non-compliant apparatus (e.g., the PC 70) can also send a Probe Request signal to search for the printer 10. At this juncture, the WFD non-compliant apparatus sequentially uses the thirteen channels 1ch to 13ch to sequentially send a Probe Request signal wirelessly. This Probe Request signal does not include P2P information. Consequently, in the Listen process, by receiving a Probe Request signal that does not include P2P information, the communication controlling unit 40 can learn that a WFD non-compliant apparatus is present in the surroundings of the printer 10.

In the Search process, the communication controlling unit 40 sequentially uses the three channels 1ch, 6ch, 11ch to sequentially send a Probe Request signal wirelessly. Thereby, the communication controlling unit 40 wirelessly receives a Probe Response signal from the specific device apparatus. This Probe Response signal includes P2P information indicating that the specific device apparatus is capable of executing the WFD function, information indicating that the specific device apparatus is in the device state, information indicating the device name of the specific device apparatus and the category of the specific device apparatus, and a MAC address of the specific device apparatus. Consequently, the communication controlling unit 40 can find the specific device apparatus.

Moreover, the specific G/O apparatus, also, can wirelessly send a Probe Response signal to the printer 10 in response to the Probe Request signal sent in the Search process of the printer 10. However, this Probe Response signal includes information indicating that the apparatus is in the G/O state, and does not include information indicating that the apparatus is in the device state. Further, as described above, even if an apparatus that is in the client state wirelessly receives a Probe Request signal from the printer 10, the apparatus that is in the client state does not wirelessly send a Probe Response signal to the printer 10. Further, even if a WFD non-compliant apparatus wirelessly receives a Probe Request signal from the printer 10, the WFD non-compliant apparatus does not send a Probe Response signal. Consequently, in the Search process, the communication controlling unit 40 can appropriately find the specific device apparatus.

Moreover, after first having executed the Scan process one time, unless a Probe Request signal is received from a WFD non-compliant apparatus, the communication controlling unit 40 repeatedly executes the set of the Listen process and the Search process a plurality of times until a predetermined period has elapsed. That is, taking into account the possibility of receiving a Probe Response signal from another WFD compliant apparatus even if a Probe Response signal has been received from a WFD compliant apparatus, the communication controlling unit 40 continues to execute the set of the Listen process and the Search process until the predetermined period has elapsed. According to this configuration, the printer 10 can appropriately find the WFD compliant apparatus.

Figure 2:
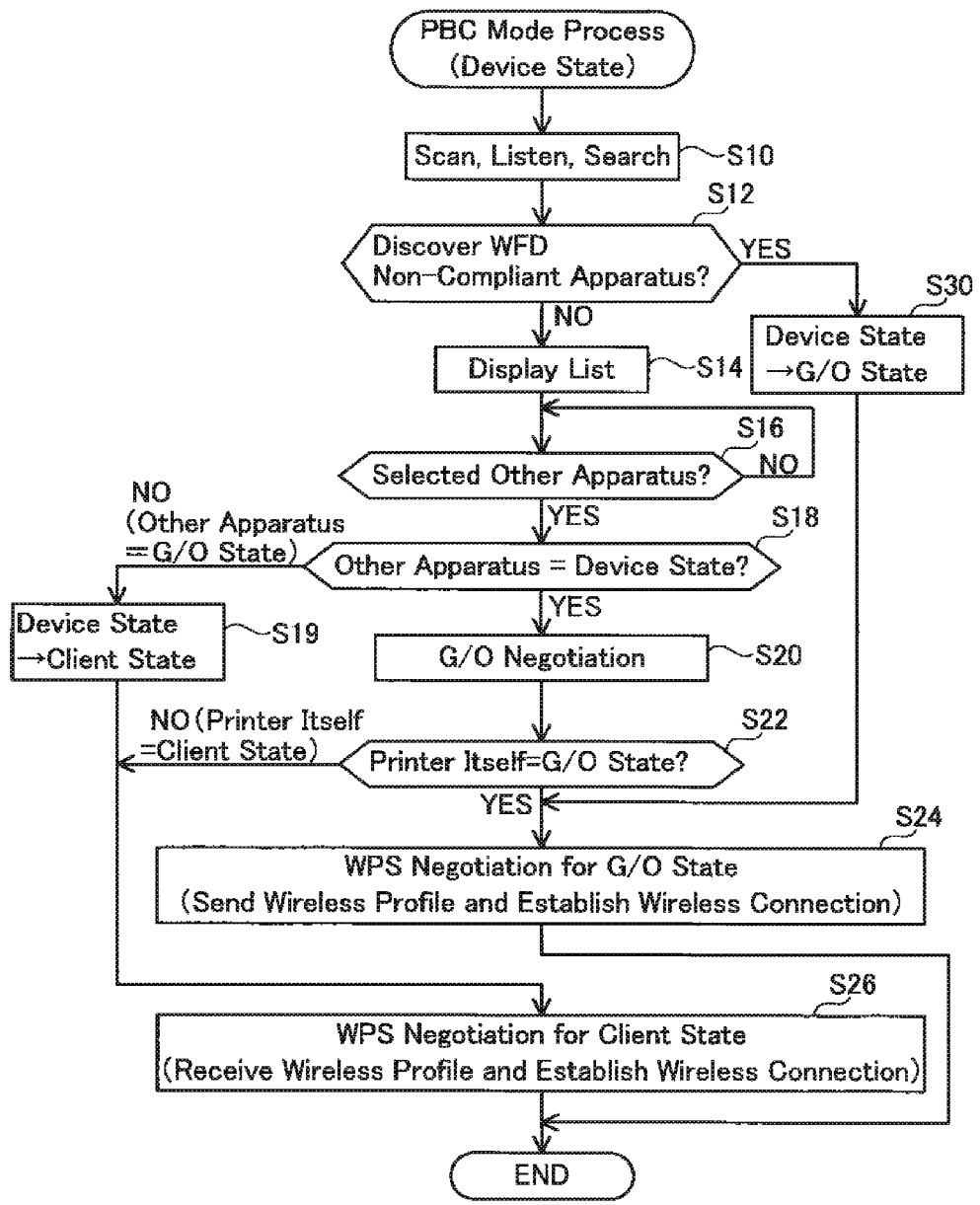
FIG. 2 shows a flowchart of a PBC mode process executed in a device state.

Although not shown in the flowchart of FIG. 2, when the predetermined period elapses, the controller 30 causes a screen in the display unit 14 to be displayed for the user to select whether to continue or end the Listen process and the Search process. If the user selects "continue", the communication controlling unit 40 repeatedly executes the set of the Listen process and the Search process for a plurality of times until the predetermined period has again elapsed. If the user selects "end", the process proceeds to S12.

On the other hand, if a Probe Request signal is received from a WFD non-compliant apparatus, the communication controlling unit 40 immediately ends the process S10, and proceeds to S12. That is, the communication controlling unit 40 ends the process S10 before the predetermined period has elapsed. In this case, since the time for the process S10 becomes shorter, a wireless connection can be established rapidly between the printer 10 and the WFD non-compliant apparatus.

In S12, the state determination unit 42 (see FIG. 1) determines whether a WFD non-compliant apparatus has been found. Specifically, in case a Probe Request signal not including P2P information was received in the Listen process of S10, the state determination unit 42 determines YES in S12, and proceeds to S30. On the other hand, in case a Probe Request signal not including P2P information was not received in the Listen process of S10, the state determination unit 42 determines NO in S12, and proceeds to S14.

The WFD non-compliant apparatus is not capable of operating as the G/O of the wireless network, but can only operate as the client of the wireless network. That is, the WFD non-compliant apparatus is maintained in the client state. Consequently, in S30 (the case where a WFD non-compliant apparatus was found), the state determination unit 42 determines that the printer 10 is to operate in the G/O state. Specifically, the state determination unit 42 changes the state flag in the memory 34 from a value corresponding to the device state to a value corresponding to the G/O state. Consequently, the printer 10 becomes able to operate in the G/O state. When S30 ends, the process proceeds to S24 without the processes S14 to S22 being performed. In S24 (to be described), which is performed after S30, the WFD non-compliant apparatus is called an "object apparatus".

In S14 (the case where a WFD non-compliant apparatus was not found), the display controlling unit 46 (see FIG. 1) causes the display unit 14 to display an apparatus list. As described above, the communication controlling unit 40 can find the specific G/O apparatus in the Scan process (see S10), and can find the specific device apparatus in the Search process (see S10). The display controlling unit 46 causes the display unit 14 to display information relating to the apparatuses found in S10 (i.e., the information acquired in S10).

Moreover, in the case of YES in S12 (the case where a WFD non-compliant apparatus was found), the display controlling unit 46 does not cause the display unit 14 to display the apparatus list. According to this configuration, the printer 10 can appropriately select whether to cause the apparatus list to be displayed according to whether a Probe Response signal is received from a WFD compliant apparatus or whether a Probe Request signal is received from a WFD non-compliant apparatus. In particular, in case a Probe Request signal is received from a WFD non-compliant apparatus, the printer 10 does not cause the apparatus list to be displayed, and consequently a wireless connection can be established rapidly between the printer 10 and the WFD non-compliant apparatus.

The user can learn the apparatuses present in the surroundings of the printer 10 by looking at the apparatus list displayed in S14, and can perform an apparatus selection operation on the operating unit 12 to select which apparatus should establish a wireless connection with the printer 10. When the apparatus selection operation has been performed, the controller 30 determines YES in S16, and proceeds to S18. Below, the apparatus selected by the apparatus selection operation (e.g., the PC 60) is called an "object apparatus".

Next, in S18, the state determination unit 42 determines whether the current state of the object apparatus is the device state. In the case where the current state of the object apparatus is the G/O state (the case of NO in S18), the process proceeds to S19, and in the case where the current state of the object apparatus is the device state (the case of YES in S18), the process proceeds to S20.

In S19 (the current state of the object apparatus=G/O state), it is determined that the printer 10 is to operate in the client state. Specifically, the state determination unit 42 changes the state flag in the memory 34 from a value corresponding to the device state to a value corresponding to the client state. Consequently, the printer 10 becomes able to operate in the client state. Moreover, in S19, the communication controlling unit 40 wirelessly sends a connection request signal to the object apparatus. Consequently, the object apparatus wirelessly sends an OK signal to the printer 10. When S19 ends, the process proceeds to S26.

In S20 (the current state of the object apparatus=device state), the state determination unit 42 executes a G/O negotiation with the object apparatus, determining one apparatus from among the printer 10 and the object apparatus as the G/O, and determining the other apparatus as the client. Specifically, the communication controlling unit 40 first wirelessly sends a connection request signal to the object apparatus. Consequently, the object apparatus also wirelessly sends an OK signal to the printer 10. Next, the state determination unit 42 wirelessly sends information indicating G/O priority of the printer 10 to the object apparatus, and wirelessly receives information indicating G/O priority of the object apparatus from the object apparatus. Moreover, the G/O priority of the printer 10 is an index indicating the priority with which the printer 10 should become the G/O, and is predetermined in the printer 10. Similarly, the G/O priority of the object apparatus is an index indicating the priority with which the object apparatus should become the G/O. For example, an apparatus (e.g., a PC) in which CPU and memory capacity are comparatively high can execute other processes rapidly while operating as a G/O. Consequently, in this type of apparatus, the G/O priority is usually set such that the priority of becoming G/O is high. On the other hand, e.g., an apparatus in which CPU and memory capacity are comparatively low might not be able to execute other processes rapidly while operating as a G/O. Consequently, in this type of apparatus, the G/O priority is usually set such that the priority of becoming G/O is low.

The state determination unit 42 compares the G/O priority of the printer 10 and the G/O priority of the object apparatus, determines the apparatus (the printer 10 or the object apparatus) with the higher priority as the G/O, and determines the apparatus (the object apparatus or the printer 10) with the lower priority as the client. In case the printer 10 was determined as the G/O, the state determination unit 42 changes the state flag in the memory 34 from a value corresponding to the device state to a value corresponding to the G/O state. Consequently, the printer 10 becomes able to operate in the G/O state. Further, in case the printer 10 was determined as the client, the state determination unit 42 changes the state flag in the memory 34 from a value corresponding to the device state to a value corresponding to the client state. Consequently, the printer 10 becomes able to operate in the client state. Moreover, the object apparatus determines the G/O and the client based on the G/O priority of the printer 10 and the G/O priority of the object apparatus by using the same method as the printer 10. When the G/O negotiation of S20 ends, the process proceeds to S22.

In S22, the establishing controlling unit 44 (see FIG. 1) judges whether the current state of the printer 10 is the G/O state, and whether the current state of the object apparatus is the client state. In a case that the current state of the printer 10 is the G/O state and the current state of the object apparatus is the client state (the case of YES in S22), the process proceeds to S24. On the other hand, in a case that the current state of the printer 10 is the client state and the current state of the object apparatus is the G/O state (the case of NO in S22), the process proceeds to S26.

In S24, the establishing controlling unit 44 executes WPS negotiation for the G/O state. Specifically, the establishing controlling unit 44 creates data showing a wireless profile (SSID, authentication mode, encryption mode, password, etc.), which is needed to establish a wireless connection, and wirelessly sends this to the object apparatus. Moreover, the authentication mode and the encryption mode are predetermined. Further, the establishing controlling unit 44 creates the password at the time of the process S24. Moreover, the SSID may be created by the establishing controlling unit 44 at the time of the process S24, or may be predetermined. The wireless profile being sent to the object apparatus allows the printer 10 and object apparatus to use the same wireless profile. That is, using the wireless profile, the printer 10 and the object apparatus wirelessly communicate an Authentication Request, Authentication Response, Association Request, Association Response, and 4 way handshake. During this process, the printer 10 and the object apparatus execute various authentication processes such as SSID authentication, authentication mode and encryption mode authentication, password authentication, etc. In case all the authentications succeeded, a wireless connection is established between the printer 10 and the object apparatus.

Moreover, if the wireless connection is established in S24, the controller 30 further adds the MAC address of the object apparatus (i.e., the MAC address included in the Probe Response signal received in Scan or Listen of S12) to the administration list. Thereby, the printer 10 (i.e., the communication controlling unit 40) that is in the G/O state becomes able to communicate object data (printing data, etc.) of a communication object with the object apparatus that is in the client state. Moreover, the object data includes network layer data, which is a layer higher than the physical layer of the OSI reference model. Consequently, the printer 10 (i.e., the communication controlling unit 40) that is in the G/O state can execute wireless communication of the network layer with the object apparatus that is in the client state. Further, it becomes possible for the printer 10 (i.e., the communication controlling unit 40) that is in the G/O state to relay wireless communication between the object apparatus which is in the client state and another apparatus which is registered in the administration list and is in the client state.

On the other hand, in S26, the establishing controlling unit 44 executes WPS negotiation for the client state. Specifically, the object apparatus creates data indicating a wireless profile (SSID, authentication mode, encryption mode, password, etc.), which is needed to establish a wireless connection, and wirelessly sends this to the printer 10. Consequently, the establishing controlling unit 44 wirelessly receives the data showing the wireless profile from the object apparatus. The subsequent processes (the communication process such as the Authentication Request, etc.) are the same as S24. Consequently, the printer 10 (i.e., the communication controlling unit 40) that is in the client state becomes able to wirelessly communicate object data (printing data, etc.) with the object apparatus that is in the G/O state. Further, it becomes possible for the printer 10 (i.e., the communication controlling unit 40) that is in the client state to wirelessly communicate, via the object apparatus that is in the G/O state, object data with another apparatus that is in the client state (i.e., another apparatus registered in the administration list of the object apparatus). When S24 or S26 ends, the PBC mode process of FIG. 2 ends.

Figure 3:
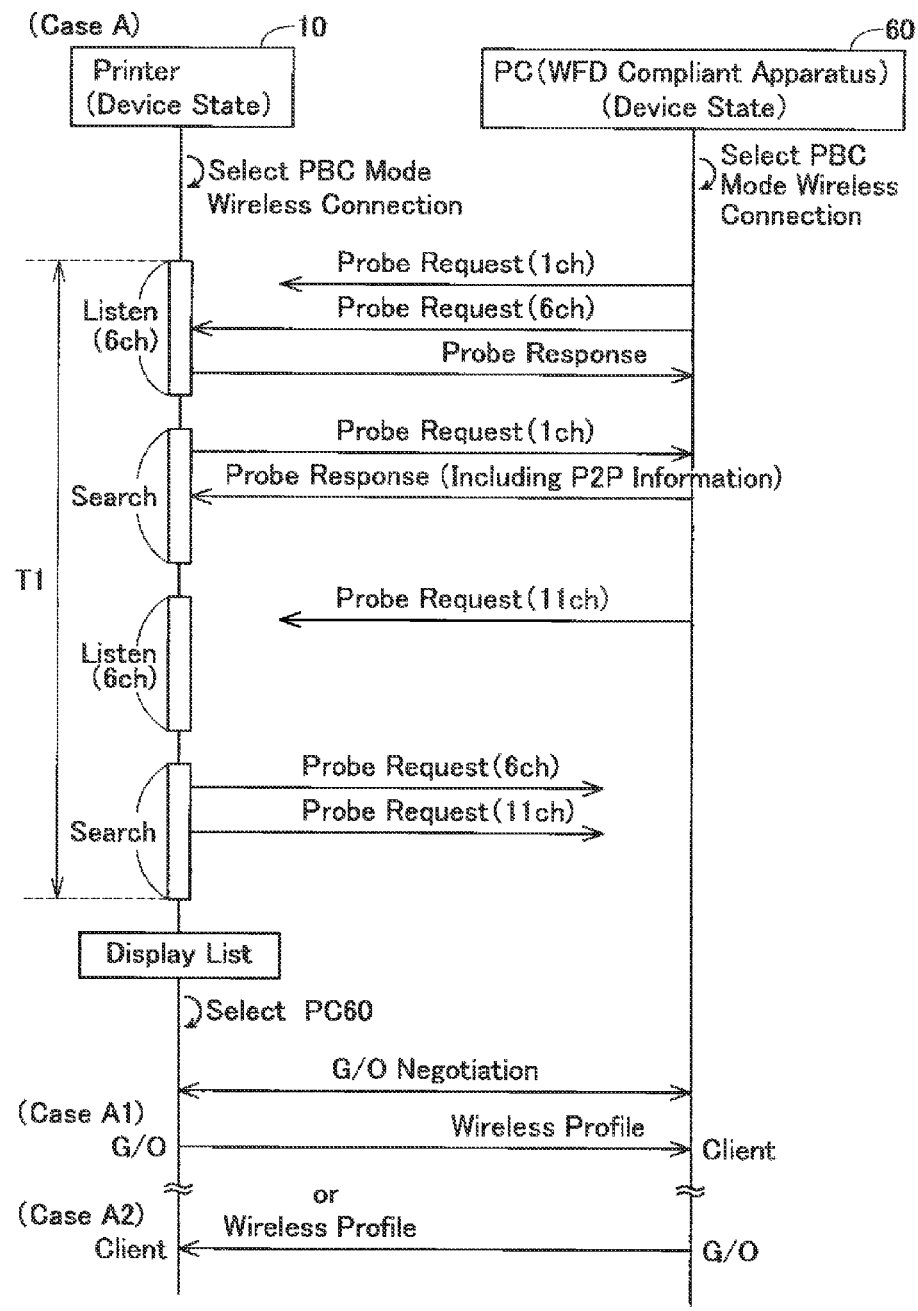
FIG. 3 shows a sequence view of a case A.

(Case A; FIG. 3)

An example of processes (Case A) executed by the printer 10 and the PC 60, which is a WFD compliant apparatus, will be described with reference to FIG. 3. In FIG. 3, a situation is assumed in which a wireless connection is to be established between the printer 10 that is in the device state and the PC 60 that is in the device state by using the WPS PBC mode. The user performs the mode selection operation to select the PBC mode on the operating unit 12 of the printer 10. In this case, the printer 10 executes the Scan process (not shown in FIG. 3), the Listen process and the Search process (S10 of FIG. 2). The printer 10 repeatedly executes the set of the Listen process and the Search process a plurality of times until a predetermined time T1 has elapsed. The user further performs the mode selection operation to select the PBC mode on an operating unit of the PC 60. In this case, the PC 60 also executes the Scan process, the Listen process and the Search process.

In the Search process, the PC 60 sequentially uses the three channels 1ch, 6ch, 11ch to sequentially send a Probe Request signal wirelessly. For example, in case the channel being used by the printer 10 is 6ch, in the Listen process the printer 10 wirelessly receives a 6ch Probe Request signal from the PC 60, and wirelessly sends a Probe Response signal to the PC 60. Thereby, the PC 60 can find the printer 10.

Similarly, in the Search process, the printer 10 sequentially uses the three channels 1ch, 6ch, 11ch to sequentially send a Probe Request signal wirelessly. For example, in case the channel being used by the PC 60 is 1ch, in the Search process the PC 60 wirelessly receives a 1ch Probe Request signal from the printer 10, and wirelessly sends a Probe Response signal to the printer 10. Thereby, the printer 10 can find the PC 60. Moreover, this Probe Response signal includes P2P information. Consequently, the printer 10 can learn that the PC 60 is able to execute the WFD function (i.e., that the PC 60 is a WFD compliant apparatus).

After the predetermined time T1 has elapsed, the printer 10 ends the Listen process and the Search process. In S14 of FIG. 2 the printer 10 causes the apparatus list to be displayed in the display unit 14. The user selects the PC 60 from the apparatus list. In this case, in S20 of FIG. 2 the printer 10 executes a G/O negotiation with the PC 60.

(Case A1)

In case A1, in the G/O negotiation, the printer 10 is determined as the G/O and the PC 60 is determined as the client. In this case, in S24 of FIG. 2 the printer 10 wirelessly sends a wireless profile to the PC 60, and establishes a wireless connection with the PC 60 by using the wireless profile.

(Case A2)

In case A2, in the G/O negotiation, the printer 10 is determined as the client and the PC 60 is determined as the G/O. In this case, in S26 of FIG. 2 the printer 10 wirelessly receives a wireless profile from the PC 60, and establishes a wireless connection with the PC 60 using the wireless profile.

Figure 4:
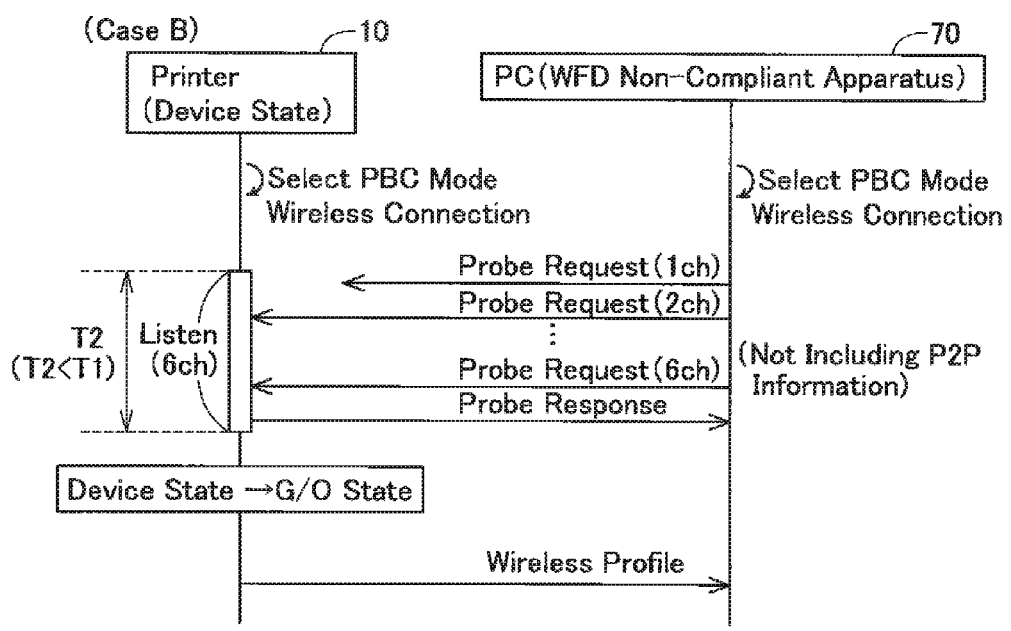
FIG. 4 shows a sequence view of a case B.

(Case B; FIG. 4)

Next, an example of processes (Case B) executed by the printer 10 and the PC 70, which is a WFD non-compliant apparatus, will be described with reference to FIG. 4. In FIG. 4, the printer 10 is in the device state. As in case A, the user performs the mode selection operation to select the PBC mode on the operating unit 12 of the printer 10. In this case, the printer 10 executes the Scan process (not shown in FIG. 3), then executes the Listen process and the Search process (S10 of FIG. 2).

The user performs the mode selection operation to select the PBC mode on an operating unit of the PC 70. In this case, the PC 70 sequentially uses the thirteen channels 1ch to 13ch to sequentially send a Probe Request signal wirelessly. For example, in case the channel being used by the printer 10 is 6ch, in the Listen process the printer 10 wirelessly receives a 6ch Probe Request signal from the PC 70, and wirelessly sends a Probe Response signal to the PC 70. Thereby, the PC 70 can find the printer 10.

The Probe Request signal received by the printer 10 does not include P2P information. Consequently, in the course of the Listen process, the printer 10 can learn that a WFD non-compliant apparatus is present. In this case, the printer 10 immediately ends the process S10 of FIG. 2. That is, the printer 10 usually executes the Search process after the Listen process (see FIG. 3). However, upon receiving a Probe Request signal from the PC 70, the printer 10 ends the process S10 of FIG. 2 without executing the Search process. Consequently, the printer 10 ends the process S10 of FIG. 2 before the predetermined time T1 of case A of FIG. 3 has elapsed. In case B, a processing time T2 of S10 of FIG. 2 becomes shorter than the processing time T1 of case A (see FIG. 3). Consequently, a wireless connection can be established rapidly between the printer 10 and the PC 70.

Next, the printer 10 determines YES in S12 of FIG. 2, and transfers from the device state to the G/O state in S30 of FIG. 2. In S24 of FIG. 2 the printer 10 wirelessly sends a wireless profile to the PC 70, and establishes a wireless connection with the PC 70 using the wireless profile.

(PBC Mode Process (Case where Printer 10=G/O State))

Figure 5:
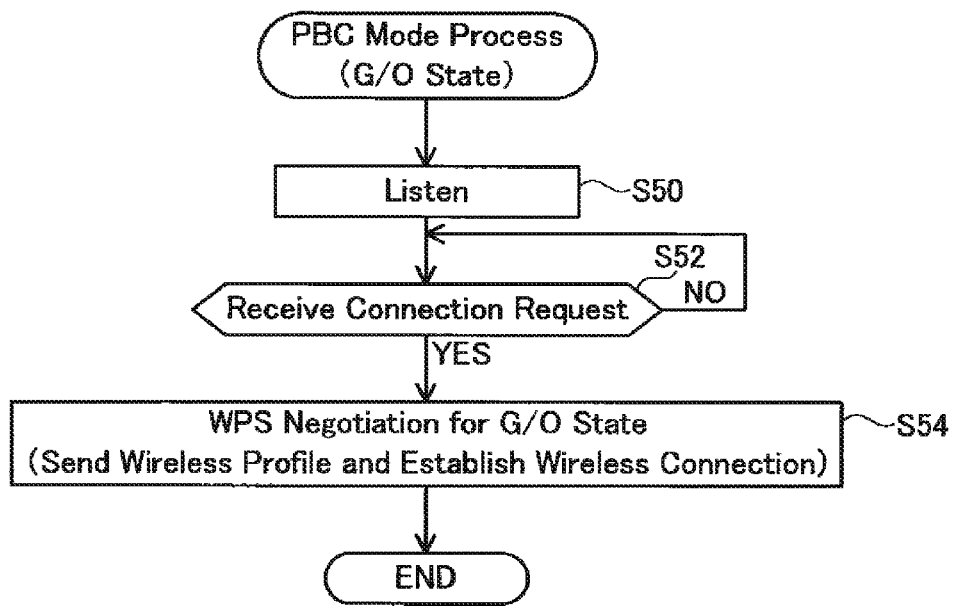
FIG. 5 shows a flowchart of a PBC mode process executed in a G/O state.

Next, the contents of the PBC mode process executed by the printer 10 that is in the G/O state will be described with reference to FIG. 5. The user performs the mode selection operation on the operating unit 12 of the printer 10 that is in the G/O state to select the PBC mode from among the PBC mode and the PIN code mode. Thereby, the PBC mode process of FIG. 5 is started.

As shown in S50, the communication controlling unit 40 starts the Listen process (i.e., continually executes the Listen process) while the printer 10 is in the G/O state. Moreover, the communication controlling unit 40 does not execute the Scan process and the Search process while the printer 10 is in the G/O state.

A situation is assumed in which the apparatus (called "object apparatus" below) which is to establish a wireless connection with the printer 10 is a WFD non-compliant apparatus. In this case, when the mode selection operation to select the PBC mode is performed, the object apparatus wirelessly sends a Probe Request signal. Since the communication controlling unit 40 is executing the Listen process in S50, the communication controlling unit 40 wirelessly sends a Probe Response signal to the object apparatus. Consequently, the object apparatus can find the printer 10.

The object apparatus causes the apparatus list that includes information relating to the printer 10 to be displayed, and the user selects the printer 10. Thereby, the object apparatus wirelessly sends a connection request signal to the printer 10. In this case, the communication controlling unit 40 determines YES in S52. Moreover, in the case that the object apparatus is a WFD compliant apparatus, also, the object apparatus can find the printer 10 and can send a connection request signal to the printer 10 in the same manner as above. In this case, also, the communication controlling unit 40 determines YES in S52.

Next, in S54, the establishing controlling unit 44 executes WPS negotiation for the G/O state. The process S54 is the same as the process S24 of FIG. 2. However, the establishing controlling unit 44 wirelessly sends the wireless profile that is being used in the wireless network which has already been configured by the printer 10 (i.e., the wireless profile created in S24 of FIG. 2) to the object apparatus. Consequently, a wireless connection is established between the printer 10 and the object apparatus. Moreover, the subsequent processes (the process for adding the MAC address of the object apparatus to the administration list, etc.) are the same as in S24 of FIG. 2.

Moreover, in case a wireless network is not being configured by the printer 10 (the case where the printer 10 is in the device state), the user can perform an operation on the operating unit 12 to transfer the printer 10 to the G/O state. In this case, the state determination unit 42 transfers the state of the printer 10 from the device state to the G/O state without executing the flowchart of FIG. 2 (S20, S30, etc.). In this case, the controller 30 executes processes according to the flowchart of FIG. 5. That is, while performing the Listen process (S50), the communication controlling unit 40 monitors whether a connection request signal has been received (S52).

Further, the user can also perform the mode selection operation to select the PBC mode from among the PBC mode and the PIN code mode on the operating unit 12 of the printer 10 that is in the client state. In this case, the state determination unit 42 transfers the state of the printer 10 from the client state to the device state. Then, the controller 30 executes the PBC mode process according to the flowchart of FIG. 2.

(Result of Present Embodiment)

As shown in case A of FIG. 3, when the printer 10 that is in the device state wirelessly receives a Probe Response signal including P2P information from the PC 60 that is a WFD compliant apparatus, the printer 10 executes the G/O negotiation (S20 of FIG. 2), and determines the state, from among the G/O state and the client state, in which the printer 10 should operate. On the other hand, as shown in case B of FIG. 4, when the printer 10 that is in the device state wirelessly receives a Probe Request signal that does not include P2P information from the PC 70 that is a WFD non-compliant apparatus, the printer 10 determines it is to operate in the G/O state (S30 of FIG. 2) without performing the G/O negotiation. This is because the PC 70 cannot become the G/O of a wireless network. Consequently, the printer 10 can appropriately determine the state in which the printer 10 is to operate according to the signal (the Probe Response signal or the Probe Request signal) received from the object apparatus with which the printer 10 is to establish a wireless connection. Since the printer 10 executes communication of a wireless profile (S24 or S26 of FIG. 2) according to the determined state, the printer 10 can establish a wireless connection with the object apparatus appropriately.

In particular, it is possible that a user with poor knowledge of wireless communication cannot appropriately understand if the object apparatus is a WFD compliant apparatus or a WFD non-compliant apparatus. In the present embodiment, even such a user can easily cause a wireless connection to be established between the printer 10 and the object apparatus. That is, if the user performs the mode selection operation to select the PBC mode in each of the printer 10 and the object apparatus, (1) in case the object apparatus is a WFD compliant apparatus, after S14 to S22 of FIG. 2 the printer 10 executes the WPS negotiation of S24 or S26, and establishes a wireless connection, (2) in case the object apparatus is a WFD non-compliant apparatus, after S30 the printer 10 executes the WPS negotiation of S24, and establishes a wireless connection. Consequently, regardless of whether the object apparatus is a WFD compliant apparatus or a WFD non-compliant apparatus, the user can easily cause a wireless connection to be established between the printer 10 and the object apparatus if he performs the mode selection operation in each of the printer 10 and the object apparatus.

(Corresponding Relationships)

The printer 10 is an example of the "wireless communication device", the PC 60 is an example of the "first external device" and the "first type of external device", the PC 70 is an example of the "second external device" and the "second type of external device". The G/O state and the client state are respectively examples of the "parent state" and the "child state". The P2P information is an example of the "predetermined information". The Probe Response signal received from the PC 60 in FIG. 3, and the Probe Request signal received from the PC 60 in FIG. 4 are respectively examples of the "first type of signal" and the "second type of signal". Further, the wireless profile sent to the PC 60 in case A1 of FIG. 3 (or the wireless profile sent to the PC 60 in case B of FIG. 4), and the wireless profile received from the PC 60 in case A2 of FIG. 3 are respectively examples of the "first wireless profile" and the "second wireless profile". Further, the period in which the Listen process and the Search process are executed (T1 of FIG. 3, T2 of FIG. 4) is an example of the "specific period". The number of channels 1ch, 6ch, and 11ch (i.e., 3) is an example of the "first number of channels", and the number of channels 1ch to 13ch (i.e., 13) is an example of the "second number of channels".

Variants of the foregoing embodiment are listed below.

(1) The "wireless communication device" is not restricted to the printer 10, but may be another apparatus capable of wireless communication (e.g., a mobile phone, PDA, PC, server, FAX device, copier, scanner, multi-function device, etc.). Further, the "external device" is not restricted to the PCs 60, 70, but may be another apparatus capable of wireless communication (e.g., a mobile phone, PDA, server, printer, FAX device, copier, scanner, multi-function device, etc.).

(2) In the foregoing embodiment, the display controlling unit 46 causes the apparatus list to be displayed in the display unit 14 provided in the printer 10. Instead, in case the display controlling unit 46 is equipped with a web server function, and a client terminal has accessed the web server of the printer 10, data indicating the apparatus list may be provided to the client terminal. In this case, the apparatus list is displayed in a display unit of the client terminal. That is, the "display unit" may be a display unit inside the wireless communication device, or may be a display unit outside the wireless communication device (i.e., a display unit configured as a separate body from the wireless communication device).

(3) The "parent state" is not restricted to the WFD G/O state, but may be any state that manages other devices constituting the wireless network (e.g., manages a list of information relating to another device, relays wireless communication of another device, etc.). Further, the "child state" is not restricted to the WFD client state, but may be any state managed by a parent state apparatus.

(4) In the foregoing embodiment, 13 (1ch to 13ch) is an example of the "second number of channels". These are the specifications used in Europe. Instead, the "second number of channels" may be 11 (1ch to 11ch; U.S. specifications), 14 (1ch to 14ch; Japanese specifications), or another number of channels.

(5) In the foregoing embodiment, the units 40 to 46 are realized by the CPU 32 of the printer 10 executing processes according to software. Instead, at least one of the units 40 to 46 may be realized by a hardware resource such as a logic circuit.

What is claimed is:

1. A wireless communication device configured to be capable of operating selectively in any state among a plurality of states including a parent state performing as a parent station of a wireless network and a child state performing as a child station of the wireless network, the wireless communication device comprising:
one or more processors; and
a memory that stores a computer program including instructions executed by the one or more processors,
wherein the instructions cause the one or more processors, when executed by the one or more processors, to function as:
a communication controlling unit configured to receive a signal from an external device;
a state determination unit configured to:
determine in which of the parent state and the child state the wireless communication device is to operate by executing a particular wireless communication for the determination in a case where the communication controlling unit receives a first type of signal including specific information, the specific information includes information indicating that the external device is capable of executing a process for determining in which of the parent state and the child state the external device is to operate; and
determine the wireless communication device is to operate in the parent state without executing the particular wireless communication in a case where the communication controlling unit receives a second type of signal not including the specific information; and
an establishing controlling unit configured to:
send a first wireless profile to a first external device so as to establish a wireless connection with the first external device by using the first wireless profile in a case where it is determined that the wireless communication device is to operate in the parent state; and
receive a second wireless profile from a second external device so as to establish a wireless connection with the second external device by using the second wireless profile in a case where it is determined that the wireless communication device is to operate in the child state.

2. The wireless communication device as in claim 1, wherein
the communication controlling unit is configured to:
receive the first type of signal from a first type of external device capable of operating selectively in any state among the plurality of states; and
receive the second type of signal from a second type of external device incapable of operating selectively in any state among the plurality of states.

3. The wireless communication device as in claim 2, wherein
the communication controlling unit is configured to receive the second type of signal from the second type of external device during a specific period for searching the first type of external device.

4. The wireless communication device as in claim 3, wherein
the specific period includes a first period and a second period,
the first period is a period for receiving a Probe Request signal from the first type of external device so as to send a Probe Response signal to the first type of external device,
the second period is a period for sending the Probe Request signal to the first type of external device so as to receive the Probe Response signal that is the first type of signal from the first type of external device, and
the communication controlling unit is configured to receive the Probe Request signal that is the second type of signal from the second type of external device in the first period.

5. The wireless communication device as in claim 3, wherein
the communication controlling unit is configured to:
continue the specific period until a predetermined time has elapsed from a start of the specific period in a case of not receiving the second type of signal from the second type of external device during the specific period; and
finish the specific period before the predetermined time has elapsed from the start of the specific period in a case of receiving the second type of signal from the second type of external device in the specific period.

6. The wireless communication device as in claim 5, wherein
the communication controlling unit is configured to continue the specific period until the predetermined time has elapsed from the start of the specific period, even if the first type of signal from the first external device is received, in the case of not receiving the second type of signal from the second type of external device.

7. The wireless communication device as in claim 2, wherein
the communication controlling unit is further configured to send sequentially a plurality of search signals for searching the first type of external device by using each channel included in a first channel group corresponding to a first number of channels,
the first type of signal is a response signal sent from the first type of external device in response to at least one search signal among the plurality of search signals, and
the second type of signal is at least one search signal among a plurality of search signals sent sequentially from the second external device, by using each channel included in a second channel group corresponding to a second number of channels that is larger than the first number of channels.

8. The wireless communication device as in claim 1, wherein
the instructions cause the one or more processors, when executed by the one or more processors, to further function as
a display controlling unit configured to:
cause a display unit to display a screen including information related to a sending source of the first type of signal in a case where the communication controlling unit receives the first type of signal; and
not cause the display unit to display a screen including information related to a sending source of the second type of signal in a case where the communication controlling unit receives the second type of signal.

9. The wireless communication device as in claim 1, wherein
the parent state is a state for the wireless communication device to relay a wireless communication executed between a plurality of devices that is operating in the child state, and
the child state is a state for the wireless communication device to execute a wireless communication with a device that is operating in the child state through a device that is operating in the parent state.

10. The wireless communication device as in claim 1, wherein
the particular wireless communication includes communicating with the external device information indicating a priority for operating in the parent state.

11. The wireless communication device as in claim 1, wherein
the parent state is a group owner state of a Wi-Fi Direct scheme,
the child state is a client state of the Wi-Fi Direct scheme, and
the state determination unit is configured to:
determine in which of the parent state and the child state the wireless communication device is to operate by executing a group owner negotiation of a Wi-Fi Direct scheme in the case where the communication controlling unit receives the first type of signal; and
determine the wireless communication device is to operate in the parent state without executing the group owner negotiation in the case where the communication controlling unit receives the second type of signal.

12. The wireless communication device as in claim 1, wherein
the specific information is P2P information of a Wi-Fi Direct scheme.

13. The wireless communication device as in claim 1, wherein
the communication controlling unit is further configured to send a first Probe Request signal,
the first type of signal is a first Probe Response signal being sent from the external device in response to the first Probe Request signal,
the second type of signal is a second Probe Request signal being sent from the external device, and
the communication controlling unit is further configured to send a second Probe Response signal in response to the second Probe Request signal.

14. The wireless communication device as in claim 1, wherein
the parent state is a group owner state of a Wi-Fi Direct scheme,
the child state is a client state of the Wi-Fi Direct scheme,
the specific information is P2P information of a Wi-Fi Direct scheme, and
the state determination unit is configured to:
determine in which of the parent state and the child state the wireless communication device is to operate by executing a group owner negotiation of a Wi-Fi Direct scheme in the case where the communication controlling unit receives the first type of signal; and
determine the wireless communication device is to operate in the parent state without executing the group owner negotiation in the case where the communication controlling unit receives the second type of signal.

15. The wireless communication device as in claim 1, further comprising
a print executing unit, wherein
the instructions cause the one or more processors, when executed by the one or more processors, to further function as:
a print data receiving unit configured to receive print data from at least one of the first external device and the second external device using at least one of the wireless connection with the first external device and the wireless connection with the second external device; and
a print controlling unit configured to cause the print executing unit to print the received print data.

16. A wireless communication device configured to be capable of operating selectively in any state among a plurality of states including a group owner state of a Wi-Fi Direct scheme performing as a parent station of a wireless network and a client state of the Wi-Fi Direct scheme performing as a child station of the wireless network, the wireless communication device comprising:
one or more processors; and
a memory that stores a computer program including instructions executed by the one or more processors,
wherein the instructions cause the one or more processors, when executed by the one or more processors, to function as:
a communication controlling unit configured to receive a signal from an external device;
a state determination unit configured to:
determine in which of the group owner state of the Wi-Fi Direct scheme and the client state of the Wi-Fi Direct scheme the wireless communication device is to operate in a case where the communication controlling unit receives a first type of signal including P2P information of the Wi-Fi Direct scheme; and
determine the wireless communication device is to operate in the group owner state of the Wi-Fi Direct scheme in a case where the communication controlling unit receives a second type of signal not including the P2P information of the Wi-Fi Direct scheme; and an establishing controlling unit configured to:
send a first wireless profile to a first external device so as to establish a wireless connection with the first external device by using the first wireless profile in a case where it is determined that the wireless communication device is to operate in the group owner state of the Wi-Fi Direct scheme; and
receive a second wireless profile from a second external device so as to establish a wireless connection with the second external device by using the second wireless profile in a case where it is determined that the wireless communication device is to operate in the client state of the Wi-Fi Direct scheme.

17. A non-transitory computer-readable storage medium that stores a computer program for a wireless communication device configured to be capable of operating selectively in any state among a plurality of states including a parent state performing as a parent station of a wireless network and a child state performing as a child station of the wireless network,
the computer program including instructions for causing one or more processors of the wireless communication device to perform:
receiving a signal from an external device;
determining in which of the parent state and the child state the wireless communication device is to operate by executing a particular wireless communication for the determination in a case where the communication controlling unit receives a first type of signal including specific information, the specific information includes information indicating that the external device is capable of executing a process for determining in which of the parent state and the child state the external device is to operate;
determining the wireless communication device is to operate in the parent state without executing the particular wireless communication in a case where the communication controlling unit receives a second type of signal not including the specific information;
sending a first wireless profile to a first external device so as to establish a wireless connection with the first external device by using the first wireless profile in a case where it is determined that the wireless communication device is to operate in the parent state; and
receiving a second wireless profile from a second external device so as to establish a wireless connection with the second external device by using the second wireless profile in a case where it is determined that the wireless communication device is to operate in the child state.

* * * * *